United States Patent [19]

Mizushima

[11] Patent Number: 4,827,147

[45] Date of Patent: May 2, 1989

[54] ENGINE-POWERED PORTABLE WORKING APPARATUS

[75] Inventor: Sadao Mizushima, Saitama, Japan

[73] Assignee: Honda Giken Kogyo Kabushiki Kaisha, Tokyo, Japan

[21] Appl. No.: 929,994

[22] Filed: Nov. 12, 1986

[51] Int. Cl.[4] .......................... H02P 9/04; F02B 63/04

[52] U.S. Cl. .................................... 290/1 A; 290/1 B

[58] Field of Search ................. 290/1 A, 1 B; 310/51; 181/202

[56] References Cited

U.S. PATENT DOCUMENTS

| | | | |
|---|---|---|---|
| 1,476,776 | 12/1923 | Stamm et al. | 310/51 |
| 3,079,687 | 3/1963 | Jepson | 310/51 |
| 3,259,752 | 7/1966 | Honda | 290/1 B |
| 3,330,515 | 7/1967 | Janssen et al. | 310/51 |
| 3,459,977 | 8/1969 | Janssen | 310/51 |
| 4,382,174 | 5/1983 | Barns | 219/370 |
| 4,402,383 | 9/1983 | Bailey | 181/202 |
| 4,490,602 | 12/1984 | Ishihara | 219/366 |
| 4,595,841 | 6/1986 | Yaguchi | 290/1 C |
| 4,608,946 | 9/1986 | Tanaka | 290/1 A |
| 4,622,923 | 11/1986 | Nishimura et al. | 290/1 B |
| 4,647,835 | 3/1987 | Fujikawa | 290/1 B |

FOREIGN PATENT DOCUMENTS

| | | | |
|---|---|---|---|
| 243916 | 11/1960 | Australia | 310/51 |
| 197417 | 11/1983 | Japan | 290/1 A |
| 17097 | 1/1984 | Japan . | |
| 170595 | 9/1984 | Japan . | |
| 2141782 | 1/1985 | United Kingdom . | |

*Primary Examiner*—Bernard Roskoski

*Attorney, Agent, or Firm*—Irving M. Weiner; Joseph P. Carrier; Pamela S. Burt

[57] ABSTRACT

Engine-powered portable working apparatus (100) including a soundproof casing (4) for accommodatingly supporting therein a main unit (1) having an engine (10) and a rotary working machine (11) driven by the engine, and a carrying handle (6) provided on the soundproof casing. The soundproof casing (4) comprises a first casing half (2) and a second casing half (3) to be joined together along a predetermined mating plane (P). The first and second casing halves (2, 3) are, respectively, integrally formed with a first handle half part (23) and a second handle half part (33) to be joined together along the mating plane (P) to thereby cooperate with each other to constitute the carrying handle (6). The working apparatus (100) further comprises an anti-vibratory member (5) for elastically holding the main unit (1) in the soundproof casing (4).

8 Claims, 2 Drawing Sheets

ENGINE-POWERED PORTABLE WORKING APPARATUS

BACKGROUND OF THE INVENTION

1. Field of the Invention

The present invention relates generally to portable working apparatus, and more particularly to engine-powered portable working apparatus having built therein an engine and a rotary working machine driven by the engine.

2. Description of Relevant Art

There have been known engine-powered portable working apparatus having built therein an engine and a rotary working machine driven by the engine, for example an electric generator. In such apparatus, a main unit consisting of the engine and the working machine is accommodated in a soundproof casing to reduce noises emanating therefrom. Moreover, a carrying handle is provided on the outside of the casing.

Exemplarily, in (1) Japanese Patent Application Lay-Open Print No. 59-17097 (laid open Jan. 28, 1984) and (2) Japanese Patent Application Lay-Open Print No. 59-170595 (laid open Sept. 26, 1984) there are disclosed portable power generating apparatus. In either apparatus, a main unit consisting of an engine and an electric generator driven by the engine is mounted on a base and covered with front and rear cover members so that the base and the cover members cooperate with each other to constitute a soundproof casing in which the base plays the role of a bottom cover member. In Lay-Open Print (1), a carrying handle is attached to the upper part of the casing. In Lay-Open Print (2), a carrying handle is integrally formed on the front cover member.

In both cases there are needed at least three members to constitute the soundproof casing, that is, the front cover member, the rear cove member, and the base as the bottom cover member. In this respect, the number of component parts of the casing is insufficiently small, so that the entirety thereof is yet not simple in constitution, needing complicated assembly work involving a large number of processes. Such problem is most notable in Lay-Open Print (1) in which the carrying handle is separately manufactured with respect to the soundproof casing. In Lay-Open Print (2), on the other hand, the manufacture of the front cover member which integrally includes the carrying handle is relatively complicated.

The present invention has been achieved to effectively solve such problem of conventional engine-powered portable working apparatus.

SUMMARY OF THE INVENTION

An object of the present invention is to provide engine-powered portable working apparatus in which a soundproof casing is composed of a smaller number of members to thereby effect simplification of its constitution, and simultaneously a carrying handle is efficiently provided without obstructing to the otherwise constitutionally simplified casing members, thereby decreasing the number of processes involved in assembling the casing.

To achieve this object, the present invention provides an engine-powered portable working apparatus comprising a main unit including an engine and a rotary working machine driven by the engine, a soundproof casing for accommodating to support therein the main unit, and a carrying handle provided on the soundproof casing, the soundproof casing comprises a first casing half and a second casing half to be joined together along a predetermined plane, and the first and second casing halves have a first handle half part and a second handle half part integrally formed thereon, respectively, to be joined together along the predetermined plane to thereby cooperate with each other to constitute the carrying handle.

Preferably, the working apparatus further comprises an anti-vibratory member for elastically holding the main unit in the soundproof casing.

Another object of the present invention is to provide engine-powdered portable working apparatus in which a soundproof casing is composed of a smaller number of members to thereby effect simplification of its constitution as well as to permit the assembly work to be decreased in the number of processes involved.

To achieve this object, the present invention provides an engine-powered portable working apparatus comprising a main unit including an engine and a rotary working machine driven by the engine, a soundproof casing which accommodatingly supports the main unit therein, and an anti-vibratory member for elastically holding the main unit in the soundproof casing. Also, the soundproof casing comprises a first casing half and a second casing half to be joined together along a predetermined plane.

The above and further features, objects and advantages of the present invention will more fully appear from the following detailed description of a preferred embodiment of the invention when the same is read in conjunction with the accompanying drawings.

DETAILED DESCRIPTION OF THE PREFERRED EMBODIMENT

Figure 1:
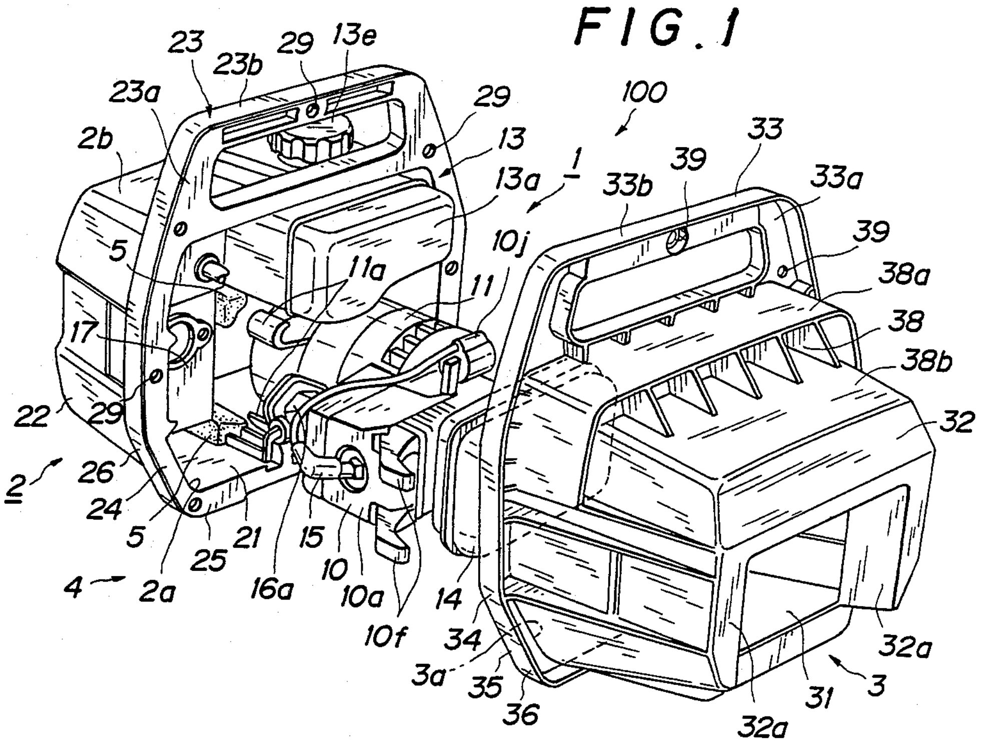
FIG. 1 is an exploded perspective view of an engine-powered portable working apparatus according to the present invention.
Figure 2:
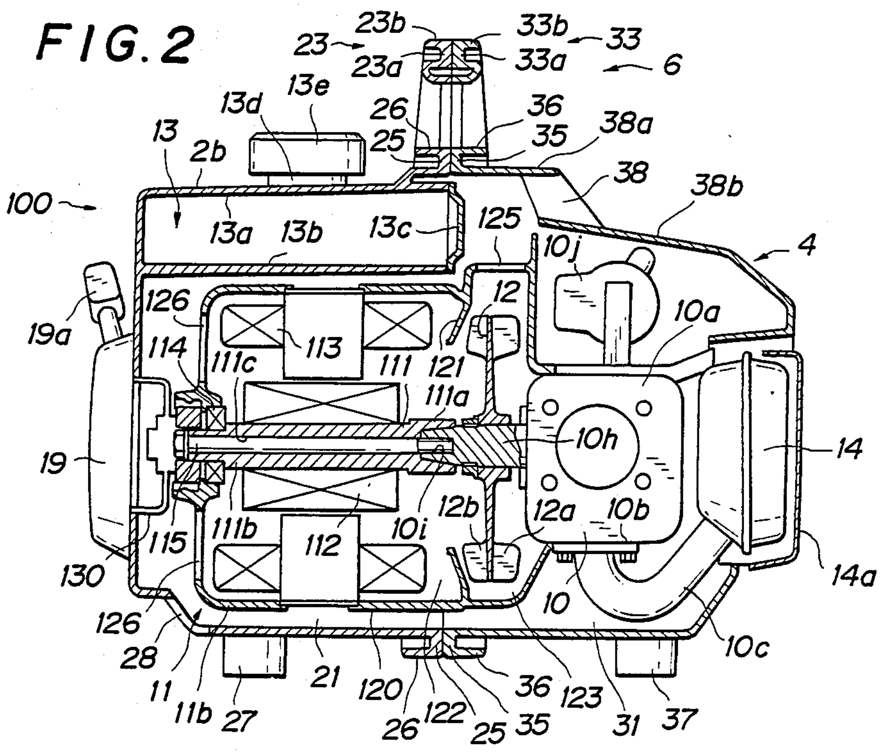
FIG. 2 is a longitudinal sectional side elevation of the working apparatus.
Figure 3:
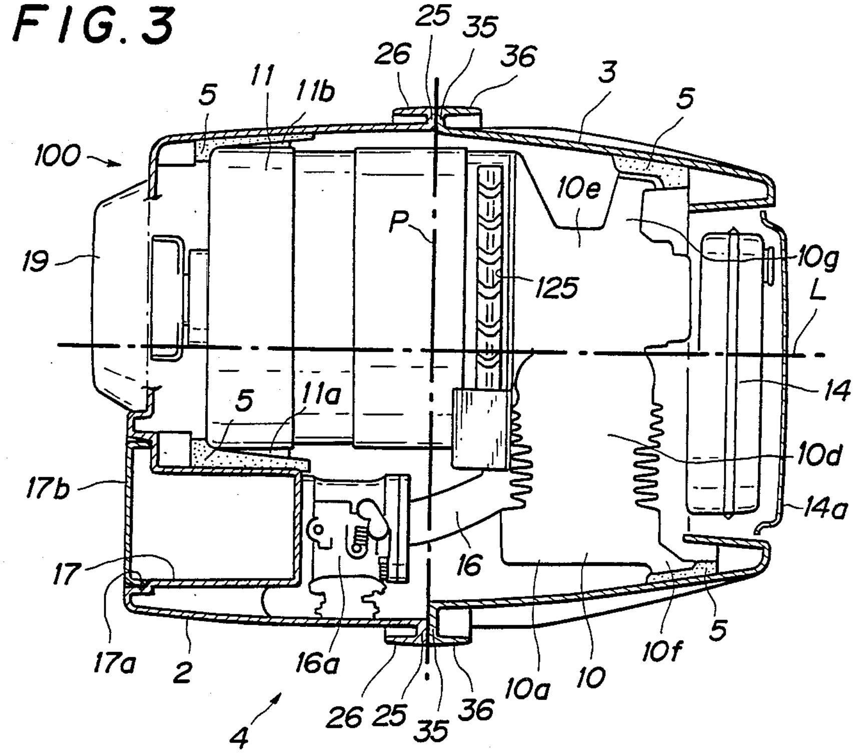
FIG. 3 is a partially cutaway longitudinal sectional plan of the working apparatus.

Referring now to FIGS. 1 to 3, designated at reference numeral 100 is an engine-powered portable working apparatus according to the present invention. FIG. 1 shows a perspective view of the working apparatus 100 as exploded, with an eye off to the rearwardly upper left. The upward and downward directions in FIG. 3 correspond to the right and left of the apparatus 100, respectively. Apparatus 100 comprises a main unit 1 and a soundproof casing 4 for accommodating to support therein the unit 1, the casing 4 being made of an ABS resin. Casing 4 is provided with a carrying handle at the upper central part thereof. The main unit 1 includes a horizontal type two-stroke engine 10, and an electric generator 11 as a rotary working machine driven by the engine. The soundproof casing 4 consists of substantially cubic front and rear halves 2 and 3 having mutually cooperating openings 2*a* and 3*a* of a substantially square form, respectively. The halves 2, 3 are joined together along a mating plane P in FIG. 3. The front half 2 is principally intended to accommodate therein the generator 11, and the rear half 3, to accommodate therein the engine 10. Between the front half 2 and generator 11 and between the rear half 3 and engine 10 there are interposed rubber mounts 5 as anti-vibratory members, respectively. The mounts 5 have their sections tapered to be reduced in thickness toward the openings 2*a*, 3*a*. Unit 1 is thus accommodated to be fixedly held in casing 4. Fuel to the engine 10 is fed from a fuel tank 13 integrally formed in the upper part of the front half 2.

The engine 10 includes a cylinder head 10*a* with an ignition plug 15 inserted thereinto, a cylinder case 10*d* continued to the cylinder head 10*a*, and a crankcase 10*e* continued to the cylinder case 10*d*. The plug 15 is connected to a self-triggering ignition device 10*j* installed on the upper part of engine 10. The horizontal engine 10 has an unshown cylinder of which the longitudinal axis extends in a perpendicular direction to the longitudinal axis L (FIG. 3) of the working apparatus 100, that is, upwardly and downwardly in FIG. 3. In the front wall of the cylinder head 10*a* there is formed an unshown suction port from which a suction pipe 16 forwardly extends. At the rear side of engine 10, a muffler 14 is arranged adjacent thereto, the muffler 14 being connected through an exhaust pipe 10*c* to an exhaust port 10*b* formed in the bottom wall of cylinder head 10. The suction pipe 16 is connected through a carburetor 16*a* to the rear side of an air cleaner 17 which is formed inside the casting front half 2 as an integral part thereof.

The cylinder head 10*a* is formed with a pair of mounting brackets 10*f*, 10*f* projecting from the upper and lower parts of the rear left edge thereof, respectively, while a crankcase 10*e* is formed with a pair of mounting brackets 10*g*, 10*g* projecting from the upper and lower parts of the rear right edge thereof. The brackets 10*f* and 10*g* are elastically held to the rear casing half 3, with rubber mounts 5 interposed therebetween.

In the engine 10, an unshown crankshaft extends in parallel with the longitudinal axis L of apparatus 100, thus perpendicularly to the mating plane P. The crankshaft has an extension 10*h* thereof projected from the crankcase 10*e* toward the front casing half 2, and a cooling fan 12 is mounted on the extension 10*h*.

The generator 11 consists of a rotor having a shaft 111 thereof arranged coaxial with the crankshaft and a winding 112 thereof wound around the shaft 111, and a stator as a field having a winding 113 thereof radially spaced apart from the rotor winding 112 by a predetermined distance. The rotor shaft 111 is supported at a rear end part 111*a* thereof fitted on the front end of the extension 10*h* of the crankshaft and at a front end part 111*b* thereof fitted in a bearing 114. In the shaft 111 there is formed an axial hollow 111*c* and a bolt 115 is inserted into the hollow 111*c* from the end of the front end part 111*b* and screwed at the opposite end into a threaded hole 10*i* formed in the crankshaft extension 10*h*. By the bolt 115, the rotor shaft 111 is fixedly joined to the extension 10*h*, so that generator 11 is directly coupled with the output shaft 10*h* of engine 10. The bearing 114, as well as the field winding 113, is fixed to a frame 120 of the stator of generator 11.

The frame 120 is fixedly joined at the rear part thereof to the crankcase 10*e* of engine 10, constituting main unit 1. Frame 120 has integrally formed on the inside thereof a narrow annular partition 121 which projects radially inwardly therefrom between the field winding 113 and cooling fan 12. By the partition 121, the inner space of frame 120 is divided into a generator chamber 122 and a fan chamber 123. Partition 121 is slightly inclined inside of the generator chamber 122. Frame 120 is formed with a plurality of air inlets 126 in the front wall thereof and an air outlet 125 in an upper peripheral wall part thereof with respect to the fan chamber 123.

A front left wall portion of frame 120 is formed with a pair of mounting brackets 11*a*, 11*a* projecting from the upper and lower parts thereof, respectively; a front right wall portion of same is formed with a pair of mounting brackets 11*b*, 11*b* projecting from the upper and lower parts thereof. The brackets 11*a* and 11*b* are elastically secured to the front casting half 2, with rubber mounts 5 interposed therebetween.

On the outside of a front right wall portion of the front casing half 2 there is provided a recoil starter 19 adapted to be started by pulling a starter knob 19*a*. The recoil starter 19 has a one-way clutch 130 thereof disposed between the bearing 114 and the front wall of the front casing half 2. When the knob 19*a* of recoil starter 19 is pulled, an unshown starter cord cooperates with the clutch 130 to rotate the rotor shaft 111, thereby starting the engine 10.

The cooling fan 12 comprises a first fin group 12*a* for suctioning air at the engine side and a second fin group 12*b* for suctioning air at the generator side.

There will be described below the constitution of the front and rear halves 2 and 3 of soundproof casing 4. Common structural features to the halves 2 and 3 are first described.

Each half 2, 3 has an accommodating portion 22, 32 defining an inner space 21, 31 for accommodating therein the main unit 1, respectively. Along the circumference of the substantially square opening 2*a*, 3*a*, a mating portion 24, 34 is integrally formed on the accommodating portion 22, 32. The mating portion 24, 34 consists of a flange part 25, 35 radially outwardly extended by a predetermined width from the edge of the opening 2*a*, 3*a*, and a bent part 26, 36 axially extended in a mutually receding manner by a predetermined width from the substantially whole part of the outer edge of the flange part 25, 35. On the mating portion 24, 34 there is integrally formed a carrying handle half portion 23, 33, which rises at both ends of the upper side of mating portion 24, 34 and continuously interconnects them with each other, thus exhibiting an inverted channel-like shape in front view. The handle half portion 23, 33 consists of a handle flange part 23*a*, 33*a* continued flush with the flange part 25, 35 of mating portion 24, 34, and a bent part 23*b*, 33*b* axially extended in a mutually receding manner by a predetermined width from the substantially whole part of the outer edge of the handle flange part 23*a*, 33*a*, the bent part 23*b*, 33*b* being continuous with the bent part 26, 36 of mating portion 24, 34. The flange parts 25, 35 and 23*a*, 33*a* have at predetermined points thereon a plurality of drill holes 29, 39 opened therethrough to apply unshown bolts for fastening the casing halves 2 and 3 to each other. Flange parts 25, 23*a* and flange parts 35, 33*a* are joined to each other along the mating plane P (FIG. 3) which is perpendicular to the longitudinal axis L of working apparatus 100 and regarded as a dividing plane of soundproof casing 4. A carrying handle 6 defined by the half portions 23, 33 has its longitudinal axis (not shown) substantially lying on the mating plane P and perpendicular to the longitudinal axis L of apparatus 100. In other words, the longitudinal axis of carrying handle 6 is substantially perpendicular to the crankshaft of engine 10 and the rotor shaft 111 of generator 11.

The mating faces of the flange parts 25 and 35 have a sufficiently large area to ensure a strong bolting connection between the casing halves 2 and 3. Such bolting therebetween is all the more ensured to be tight by the provision of handle flange parts 23*a* and 33*a*. Moreover, the flange parts 25, 23*a* and 35, 33*a* are formed with the bent parts 26, 23*b* and 36, 33*b* so that the rigidity of such flange parts is increased as well as that of soundproof casing 4.

As shown in FIGS. 2 and 3, in one half 2 of soundproof casing 4 there is accommodated a main part of generator 11, and in the other half 3 of same, engine 10 and cooling fan 12. Carrying handle 6 is arranged between the halves 2, 3 of casing 4. Accordingly, roughly speaking, engine 10 and generator 11 are disposed at respective sides of handle 6, so that the apparatus 100 is well balanced when carried with the handle 6 in hand. Such balance permits the working efficiency of apparatus 100 to be improved. Moreover, the longitudinal axis of handle 6 is substantially arranged perpendicular to both the crankshaft of engine 10 and rotor shaft 111 of generator 11, so that the handle 6 is unlikely to receive the effect of inertial forces of the engine 10 and generator 11.

Those structural features peculiar to either half 2 or 3 are described below.

The front casing half 2 is integrally formed with the fuel tank 13 in the upper right part thereof and a casing of air cleaner 17 in the left part thereof. More particularly, an upper wall 2*b* of the front half 2 is partially employed as an upper wall 13*a* of the fuel tank 13, and the front wall of the half 2 is integrally formed with a substantially channel-like partition wall 13*b* which cooperates with the upper wall 13*a* so as to define a fuel chamber. The fuel chamber has its rear opening closed with a separate cap 13*c*. On the upper surface of fuel tank upper wall 13*a* there is provided a fuel filling pipe 13*d* on which a cap 13*e* is screwed. The casing of air cleaner 17 is formed inside the front wall of the half 2, as an integral part thereof inwardly recessed to have an unshown air cleaning element accommodated therein. The air cleaner 17 has a front opening 17*a* thereof closed with a cap 17*b* which is formed with an unshown air intake. The rear wall of the cleaner casing is adapted to have the carburetor 16*a* connected thereto. In front of generator 11, the bottom wall of the half 2 has integrally formed on the lower surface thereof a pair of front legs 27, 27 downwardly projecting at the left and right thereof, respectively. Such legs may be separately formed by using rubber members. Cooling air inlets 28, 28 are opened in the bottom wall of the half 2, at locations slightly forwardly distant from the legs 27, 27.

The rear casing half 3 has a rear portion 32*a* adapted as a muffler accommodating part thereof, which covers a muffler 14, when viewed from above and at both sides. At the back of muffler 14 there is provided a muffler cover 14*a* having many air inlets. The upper wall of the casing half 3 is composed by having a front part 38*a* thereof substantially flush with the upper wall 2*b* of the front casing half 2 and a rear part 38*b* thereof stepped down to be spaced apart at a predetermined distance from the front part 38*a*, so that an opening 38 for discharging cooling air is formed between the front and rear parts 38*a*, 38*b*. The opening 38 is substantially stretched over the entire width of apparatus 100. The front part 38*a* cooperates with the upper wall 2*b* of the front casing half 2 to cover generator 11 and cooling fan 12 from thereabove, and the rear part 38*b* covers engine 10 from thereabove. Behind the engine 10, the bottom wall of the half 3 has integrally formed on the lower surface thereof a pair of rear legs 37, 37 downwardly projecting at the left and right thereof, respectively. Such legs also may be separately formed by using rubber members.

Figure 4:
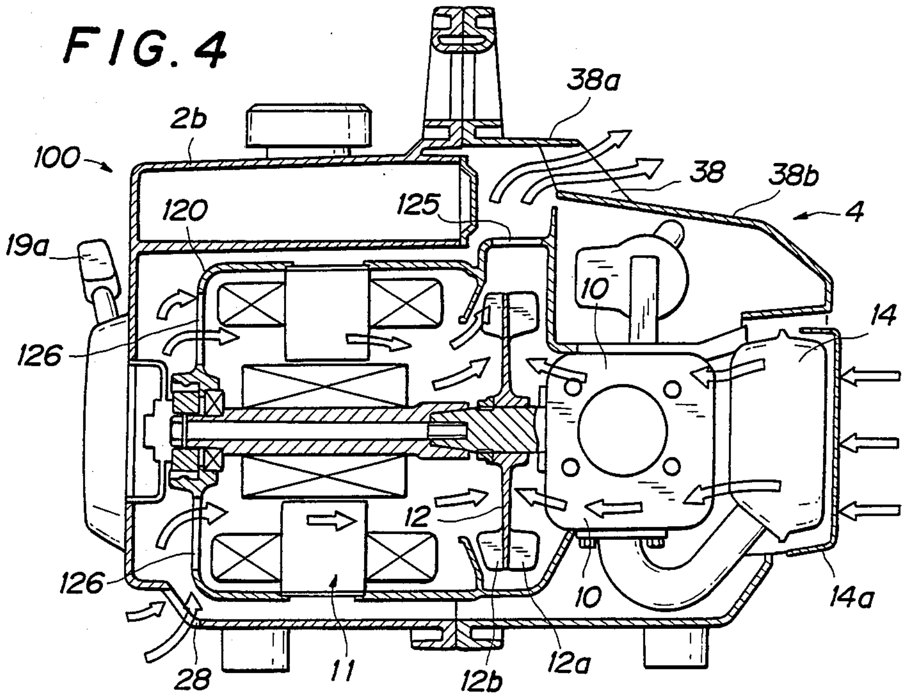
FIG. 4 is a view, similar to FIG. 2, for describing the flow direction of cooling air in the working apparatus.

In the engine-powered working apparatus 100 with the described constitution, the cooling air flows as shown in FIG. 4.

A part of the cooling air is suctioned in from the air inlets of muffler cover 14*a* by the first fin group 12*a* of cooling fan 12 and conducted so as to cool the walls of muffler 14 and engine 10. Then, it is discharged out through the upper opening 125 of the generator frame 120 and the upper opening 38 of the rear casing half 3. Additional cooling air suctioned through the air inlets 28 at the lower front part of the front casing half 2 by the second fin group 12*b* of cooling fan 12 is conducted through the front openings 126 of generator frame 120 into generator 11, thus cooling the generator 11 from inside thereof. Then, this cooling air is discharged out through the upper opening 125 of frame 120 and the upper opening 38 of rear casing half 3. As a result, both engine 10 and generator 11 are effectively cooled.

In the foregoing embodiment, the engine-powered working apparatus 100 has the main unit 1 including the engine 10 and the generator 11 as a rotary working machine driven by the engine 10, and the unit 1 is accommodated to be held in the soundproof casing 4 which consists of the front and rear halves 2, 3 to be joined to each other along the mating plane P. The casing halves 2, 3 include the handle half portions 23, 33 to be joined together along the mating plane P to cooperate with each other to constitute the carrying handle 6. Accordingly, the soundproof casing 4 is constituted with a very small number of component parts and simplified in constitution. Moreover, the carrying handle 6 is provided without obstructing the reduction in number of components and the simplification of constitution. As a result, there is provided an engine-powered working apparatus of which the assembly work is simplified and involves a reduced number of processes.

Moreover, in the working apparatus 100, the front and rear halves 2, 3 of the soundproof casing 4 have the anti-vibratory members 5 provided inside thereof, respectively, so that the main unit 1 is permitted to be elastically held through the members 5 in the casing 4 by simply fixing the members 5 inside the casing halves 2, 3 before putting the halves 2, 3 on the unit 1 and fastening them together. Thus, the assembly work is further simplified.

Incidentally, the mating plane P may be arbitrarily bent or curved, as necessary.

Although there has been described what is at present considered to be the preferred embodiment of the invention, it will be understood that the present invention may be embodied in other specific forms without departing from the spirit or essential characteristics thereof. The present invention is therefore to be considered in all respects as illustrative but not restrictive. The scope of the invention is indicated by the appended claims rather than by the foregoing description.

I claim:

1. Engine-powered portable working apparatus comprising a main unit including an engine and a rotary working machine driven by said engine, and a soundproof casing for accommodating to support therein said main unit, wherein:

said soundproof casing comprises a first casing half and a second casing half to be joined together along a predetermined plane;

said apparatus further comprises anti-vibratory members for elastically holding said main unit in said soundproof casing and a carrying handle provided on said soundproof casing;

said rotary working machine and said engine are substantially accommodated in said first casing half and said second casing half, respectively;

a drive shaft of said rotary working machine and a crankshaft of said engine are arranged co-axial with each other and directly coupled with each other, and are arranged perpendicular to the longitudinal axis of said carrying handle;

said anti-vibratory members being provided inside of said soundproof casing so as to clamp said rotary working machine at peripheral portions thereof inside of the first casing half to elastically secure said rotary working machine between said anti-vibratory members, and also clamp the engine at peripheral portions thereof inside of the second casing half to elastically secure the engine between the anti-vibratory members; and said first and second casing halves have a first handle half part and a second handle half part integrally formed thereon, respectively, to be joined together along said predetermined plane to thereby cooperated with each other to constitute said carrying handle.

2. Engine-powered portable working apparatus according to claim 1, wherein:

the longitudinal axis of said carrying handle lies substantially on said joining plane.

3. Engine-powered portable working apparatus according to claim 1, wherein:

said first and second casing halves are made of a resin.

4. Engine-powered portable working apparatus according to claim 1, wherein:

said first casing half and said second casing half are formed with cooperating openings opening at said joining plane, respectively;

said first casing half and said second casing half are integrally formed with connecting portions for connecting said casing halves to each other substantially along the entire circumferences of said cooperating openings, respectively; and said first and second handle half parts are integrally formed in a continuous manner on said connecting portions, respectively.

5. Engine-powered portable working apparatus according to claim 4, wherein:

said connecting portions of said first casing half and said second casing half comprise flange parts radially outwardly extended by a predetermined width from the edges of said cooperating openings, and bent parts mutualy recedingly extended by a predetermined width from substantially entire circumferential parts of the outer edges of said flange parts, respectively; and said first and second handle half parts comprise handle flange parts continued flush with said flange parts of said connecting portions, and bent parts mutually recedingly extended from substantially entire circumferential parts of the outer edges of said handle flange parts and continuous with to said bent parts of said connecting portions, respectively.

6. Engine-powered portable working apparatus according to claim 1, wherein:

said main unit further comprises a cooling fan provided between said rotary working machine and said engine; and an upper wall of said soundproof casing comprises a first part covering said rotary working machine from thereabove and a second part covering said engine from thereabove, said second part being downwardly spaced apart from said first part so that an opening is formed between said first part and said second part at a position corresponding to said cooling fan.

7. Engine-powered portable working apparatus according to claim 1, wherein:

said soundproof casing is integrally formed with at least a part of a fuel tank for feeding fuel to said engine.

8. Engine-powered portable working apparatus according to claim 1, wherein:

said soundproof casing is integrally formed with at least a part of an air cleaner case for said engine.

* * * * *

UNITED STATES PATENT AND TRADEMARK OFFICE

CERTIFICATE OF CORRECTION

PATENT NO. : 4,827,147

DATED : May 2, 1989

INVENTOR(S) : Sadao Mizushima

It is certified that error appears in the above-identified patent and that said Letters Patent is hereby corrected as shown below:

Column 1, line 37, change "cove" to --cover--;
line 59, delete "to".
Comumn 2, line 1, change "casing, the" (first occurence) to --casing. The--;
line 13, change "engine-powdered" to --engine-powered--.
Column 4, line 8, change "respectively;" to --respectively, while--;
line 12, change "casting" to --casing--.
Column 5, line 14, correct the spelling of "roughtly" to --roughly--.

Signed and Sealed this

Twenty-third Day of January, 1990

*Attest:*

JEFFREY M. SAMUELS

*Attesting Officer* *Acting Commissioner of Patents and Trademarks*